(12) United States Patent
Bontjer et al.

(10) Patent No.: US 8,703,221 B2
(45) Date of Patent: Apr. 22, 2014

(54) METHOD FOR PREPARING FOOD PRODUCTS BY CO-EXTRUSION, IN PARTICULAR SAUSAGE, AND FOOD PRODUCTS OBTAINED WITH THIS METHOD

(75) Inventors: Marcus Bernard Hubert Bontjer, Aarle Rixtel (NL); Martinus Wilhelmus Johannes Theodorus Kuijpers, Oploo (NL); Kasper Willem Van Den Berg, Oss (NL)

(73) Assignee: Stork Townsend B.V., Oss (NL)

( * ) Notice: Subject to any disclaimer, the term of this patent is extended or adjusted under 35 U.S.C. 154(b) by 853 days.

(21) Appl. No.: 11/721,638

(22) PCT Filed: Jun. 15, 2006

(86) PCT No.: PCT/NL2006/050136
§ 371 (c)(1),
(2), (4) Date: Aug. 30, 2007

(87) PCT Pub. No.: WO2006/135238
PCT Pub. Date: Dec. 21, 2006

(65) Prior Publication Data
US 2008/0220130 A1    Sep. 11, 2008

(30) Foreign Application Priority Data

Jun. 17, 2005 (NL) .................................... 1029272

(51) Int. Cl.
*A22C 13/00* (2006.01)
*A23P 1/12* (2006.01)
*A22C 11/00* (2006.01)
*A23L 1/317* (2006.01)
*A23L 1/00* (2006.01)

(52) U.S. Cl.
CPC ............. *A22C 13/0016* (2013.01); *A22C 11/00* (2013.01); *A23L 1/0079* (2013.01)
USPC .......................................... 426/105; 426/277

(58) Field of Classification Search
CPC ........... A23V 2002/00; A23V 2200/22; A23V 2250/5026; A23V 2250/5036; A23V 2250/5422; A23V 2250/5432; A22C 11/00; A22C 11/0209; A22C 13/0016; A22C 2013/0023; A23L 1/0047; A23L 1/0052; A23L 1/1179; A23L 1/3175
USPC .................................................. 426/105, 277
See application file for complete search history.

(56) References Cited

U.S. PATENT DOCUMENTS

| | | | | |
|---|---|---|---|---|
| 3,366,495 A | * | 1/1968 | Paul et al. ...................... | 426/546 |
| 3,782,977 A | * | 1/1974 | Henderson et al. ............ | 426/140 |
| 6,331,104 B1 | * | 12/2001 | Kobussen et al. .......... | 425/133.1 |
| 2004/0037922 A1 | * | 2/2004 | Goorhuis ........................ | 426/89 |
| 2004/0091581 A1 | | 5/2004 | Joly et al. | |

FOREIGN PATENT DOCUMENTS

| | | |
|---|---|---|
| GB | 1040770 | 9/1966 |
| GB | 1450687 | 9/1976 |
| NL | 1016018 | 3/2002 |
| WO | 9955165 | 11/1999 |
| WO | 0215715 A1 | 2/2002 |
| WO | 03041504 A1 | 5/2003 |

* cited by examiner

*Primary Examiner* — D. Lawrence Tarazano
*Assistant Examiner* — Jerry W Anderson
(74) *Attorney, Agent, or Firm* — Zarley Law Firm, P.L.C.

(57) ABSTRACT

The invention relates to a method for preparing food products by co-extrusion, comprising of producing the food product from a filler mass and a casing mass which is liquid prior to the co-extrusion, wherein the casing mass comprises at least collagen and alginate. The invention also relates to a food product obtained by co-extrusion, comprising a meat mass and a casing, wherein the casing comprises at least collagen and alginate.

20 Claims, No Drawings

METHOD FOR PREPARING FOOD PRODUCTS BY CO-EXTRUSION, IN PARTICULAR SAUSAGE, AND FOOD PRODUCTS OBTAINED WITH THIS METHOD

BACKGROUND OF THE INVENTION

The present invention relates to a method for preparing food products by means of co-extrusion, as well as to a food product manufactured in such a manner.

The manufacture of encased food products by co-extrusion is known from GB-A-1 232 801. In this document co-extrusion is described using a casing mass made up of collagen, being a protein, which is strengthened into a usable sausage skin after co-extrusion. Another method of manufacturing an encased food product is described in GB-A-1 040 770, from which is known the use of collagen in combination with alginate for manufacturing casings for sausage products. The casings are inflated and then filled with for instance a meat mass. In this document however, use is not made of co-extrusion.

The advantages of co-extrusion in modern sausage manufacture, such as speed and uniformity of the product, are evident. Large cost-savings are also possible compared to methods wherein a preformed casing is filled, wherein the casings are for instance natural intestine or casings obtained by means of extrusion The arranging of a collagen casing in a co-extrusion process does however result in a sausage skin with properties which are not practicable for every type of sausage.

SUMMARY OF THE INVENTION

The invention relates particularly to a method for producing the food products from a meat mass and a casing mass which is liquid prior to the co-extrusion, wherein the casing mass comprises collagen and alginate.

Such a method is known from NL-A-1016018. This document describes the preparation of sausage by means of co-extrusion, wherein in a preferred embodiment the skin mass, in combination with alginate and galactomannans, contains a collagen content of between 1.5% and 2.5%, or greater than 1.5%.

The object of the invention is to provide a method for manufacturing a co-extruded food product, with an improved stability of the skin.

DETAILED DESCRIPTION OF A PREFERRED EMBODIMENT OF THE INVENTION

This object is achieved with a method wherein use is made of co-extrusion and wherein the casing mass comprises at least water, collagen and an alginate, wherein the casing mass comprises a greater weight content of collagen than of alginate. The combination of co-extrusion, collagen and alginate in such a composition results in a food product with a casing which retains its strength for a surprisingly long time. The ratio of collagen and alginate results, after further processing, in a casing in which the ratio of collagen and alginate substantially corresponds to the ratio of collagen and alginate in the casing mass. The most favourable stability is obtained if the ratio between collagen and alginate is not greater than 10:1.

This composition results in a skin whose stability and strength are maintained for a longer period of time. It has been established that a stable product can be obtained for a longer period of time (of at least several days) due to a greater collagen content. In a known skin, consisting of alginate and galactomannans, the skin mass loses its strength in the course of time, which is prevented according to the present invention by applying a higher collagen content.

Although mixtures with other proteins are in no way precluded, tests with collagen have been found to yield excellent results. Collagen furthermore has the advantage that it is readily available and that it is an accepted product in this branch of industry. The collagen can be of diverse origins, such as for instance cows and/or pigs.

Alginate is an accepted additive in the food processing industry and in this application yields optimum results. Mixtures with other polysaccharides are however not precluded. The advantages can also be obtained in a food product obtained by co-extrusion. The alginate is a polyanion and can be bonded to diverse cations. Examples of such cations are sodium, potassium and ammonium ($Na^+$, $K^+$, $NH_4^+$). Na-alginate is found to be particularly advantageous here.

It is noted here that, in addition to water, the casing mass according to NL-A-1016018 also comprises gums, consisting of galactomannans, which will make a certain contribution toward the stability of the casing (in other words: covering or skin) obtained from the casing mass. In the present invention the addition of such gums or other strengthening agents is however not necessary. A simpler method becomes possible through the use of fewer different ingredients, since fewer substances have to be mixed. It is most recommended that the casing mass comprises collagen as the only protein and alginate as the only polysaccharide. These advantages also become manifest in a food product obtained by co-extrusion, comprising a filling mass and a casing, wherein the casing comprises at least collagen and an alginate, wherein the weight content of collagen is greater than the weight content of alginate. At such a weight ratio there occurs an unexpected improvement in stability compared to mixtures in which less collagen than alginate is used. Use is made here of the weight of sodium alginate, for other alginate salts the relevant weight ratio can be calculated on the basis of molecular weight.

The weight content of collagen in the casing mass is preferably more than 1.2 times greater than the alginate content. The period of time for which the stability of the formed casing is guaranteed becomes longer at such a weight ratio. The weight content of collagen in the casing mass is more preferably more than 1.5 times, more preferably more than twice and most preferably more than 2.5 times greater than the alginate content. Tests have shown that the results are optimal in compositions of the casing mass above these weight ratios.

These favourable results are also manifest in a food product obtained by co-extrusion wherein the weight content of collagen in the skin is more than 1.2 times, preferably more than 1.5 times, more preferably more than twice and most preferably more than 2.5 times greater than the alginate content. The ratio of collagen and alginate preferably lies between 1.2:1 and 10:1, more preferably between 1.2:1 and 4:1. An optimum stability of the casing is obtained at a ratio between 2:1 and 4:1.

The inventors have found that the skin of the food product remains stable for a period of up to about 14 days after the co-extrusion when the casing mass used in the method according to the invention comprises between 2 and 7% by weight, preferably between 3 and 6% by weight and most preferably between 3.5 and 5.5% by weight of collagen. An additional process, such as for instance smoking or cooking, is not necessary here. A food product as manufactured according to the invention can thus be stored fresh while the skin thereof still remains stable for a sufficiently long time.

A further optimization of the properties of the skin is obtained when the casing mass comprises between 1 and 5% by weight of alginate (assuming the weight of sodium alginate), and preferably between 2 and 4% by weight of alginate.

It is advantageous if at least during the co-extrusion the casing mass has a pH between 4 and 10, preferably between 4 and 5. An optimum stability is found to be achieved in the obtained product at such a pH.

It is advantageous if the casing mass also comprises between 0-3% by weight of carageenan. Addition of carageenan is found to provide a further improvement in the stability. The casing mass preferably comprises at least 1% by weight of carageenan.

In a preferred embodiment the casing mass also comprises between 0-7% by weight of gelatin. Addition of gelatin gives an improved stability. The casing mass preferably comprises at least 1% by weight of gelatin.

The casing mass preferably also comprises between 0-10% cross-linker consisting of liquid smoke extract and/or pyrolyzed sugars. Use of such a cross-linker provides a further improvement in stability. Liquid smoke extract is commercially available. A particularly useful pyrolyzed sugar is maillose. The casing mass preferably comprises at least 1% by weight of liquid smoke extract and/or pyrolyzed sugars. The extrusion of the casing of the food product preferably takes place by means of an extrusion nozzle which generates shear forces in the casing mass in a direction transversely of the direction of extrusion. In casing masses of the composition according to the invention wherein more collagen than alginate is used, this method is found to provide an exceptionally stable casing in the final product.

In its plastic state the casing mass is subjected by such an extrusion nozzle to shear forces during the co-extrusion process. These shear forces not only act in the direction of the co-extrusion process, but also in the direction transversely thereof. The fibres or molecules of the collagen are hereby guided in mutually differing directions, which increases the number of intersecting fibres or molecules, whereby the strength and durability of the skin greatly increase.

The extrusion of the casing of the food product preferably takes place by means of an extrusion nozzle comprising at least one part rotating with a movement component at an angle to the direction of extrusion and coming into contact with the casing mass. This measure results in a relatively simple construction of the extrusion nozzle, wherein the casing mass is subjected to shear forces, also in the direction transversely of the direction of extrusion.

The shear forces can be increased further when the extrusion of the casing of the food product takes place by means of an extrusion nozzle which comprises two parts which are rotatable in mutually opposed directions and which come into contact with the casing mass.

As is otherwise usual in co-extrusion processes, in the method according to the invention the co-extruded product is also immersed in or sprayed with a liquid which increases the strength of the skin. After extrusion the food product is preferably brought into contact with a salt solution in order to thus gelate or precipitate the skin.

Use is preferably made for this purpose of a salt solution in the form of a solution of a calcium salt, which is a salt which is suitable for food products and preferably has a low cost price.

Use is particularly made here of a salt in the form of calcium chloride ($CaCl_2$), calcium lactate and/or calcium acetate.

The inventors have found that this effect is optimal in food products which have been prepared by the above described method when the concentration of the salt in the liquid lies between 0.1% and 20%.

It has moreover been found that the temperature of the liquid preferably lies between 0 and 40° C. in order to obtain optimal results, and that the contact time of the sausage with the liquid lies between 0.1 and 40 seconds.

There are various options for exposing the food product to the liquid; it is possible to sprinkle the food product with the liquid, but it is also possible to immerse the food product in the liquid.

The method according to the invention is applicable to numerous types of food product, but the largest field of application is foreseen here in the manufacture of sausage and sausage-related products. The invention therefore also relates to a sausage obtained by co-extrusion.

Although other types of sausage such as smoked sausage or cooked sausage are not precluded, the advantages of the invention are particularly manifest when the method is used for the preparation of a fresh sausage. Fresh sausage is herein understood to mean sausage which is not subjected to a heat treatment prior to sale. Fresh sausage is generally cooled or frozen after production and sold to the consumer in cooled or frozen state. Examples of fresh sausage are sausage in general, breakfast sausages, chipolata sausage and fresh sausage in the wider sense of the word. Other types of sausage, which are not subjected to a heat treatment before they are sold, are in no way precluded.

Attention is drawn here to the fact that a treatment, such as smoking or cooking, is usually applied in other types of sausage which generally has a positive effect on the stability, the strength and the lifespan of the skin of the sausage. Such treatments are not applied in the case of fresh sausage, so that it is of the greatest importance that the skin of this type of sausage not only has sufficient initial stability, but that this stability is maintained during the lifespan of the sausage. In view of the fact that fresh sausage does not undergo any preservative treatment, the usual maximum lifespan of this sausage lies between 10 and 14 days.

In order to prevent rapid deterioration of the fresh sausage, the fresh sausage is preferably subjected to a cooling treatment once it has been brought to length, wherein the sausage is cooled to a temperature below 7° C. The sausage is preferably frozen.

What is claimed is:

1. Method for preparing food products by co-extrusion, comprising of producing the food product from a filler mass and a casing mass which is liquid prior to the co-extrusion, wherein the casing mass comprises at least water, collagen and an alginate, wherein the casing mass comprises a greater weight content of collagen than of alginate, wherein the weight content of collagen in the casing mass is more than 1.2 times greater than the alginate content and the casing mass has a pH between 4 and 5.

2. Method as claimed in claim 1, wherein the weight content of collagen in the casing mass is more than 1.5 times greater than the alginate content.

3. Method as claimed in claim 1, characterized in that the casing mass comprises between 2 and 7% by weight of collagen.

4. Method as claimed in claim 1, characterized in that the casing mass comprises between 1 and 5% by weight of alginate.

5. Method as claimed in claim 1, characterized in that the alginate is substantially sodium alginate.

6. Method as claimed in claim 1, characterized in that the casing mass also comprises between 0-3% by weight of carageenan.

7. Method as claimed in claim 1, characterized in that the casing mass also comprises between 0-7% by weight of gelatin.

8. Method as claimed in claim 1, characterized in that the casing mass also comprises between 0-10% by weight of cross-linker consisting of liquid smoke extract and/or pyrolyzed sugars.

9. Method as claimed in claim 1, characterized in that the extrusion of the casing of the food product takes place by means of an extrusion nozzle which generates shear forces in the casing mass in a direction transversely of the direction of extrusion.

10. Method as claimed in claim 9, characterized in that the extrusion of the casing of the food product takes place by means of an extrusion nozzle comprising at least one part rotating with a movement component at an angle to the direction of extrusion and coming into contact with the casing mass.

11. Method as claimed in claim 9, characterized in that the extrusion of the casing of the food product takes place by means of an extrusion nozzle which comprises two parts which are rotatable in mutually opposed directions and which come into contact with the casing mass.

12. Method as claimed in claim 1, characterized in that after extrusion the food product is brought into contact with a salt solution, wherein the salt solution comprises at least a calcium salt, wherein the concentration of calcium ions in the salt solution is at least 3.25 mmol/kg.

13. Method as claimed in claim 12, characterized in that the food product is sprinkled with the salt solution after co-extrusion.

14. Method as claimed in claim 12, characterized in that the food product is immersed in the salt solution after co-extrusion.

15. Method as claimed in claim 1, characterized in that sausage, preferably fresh sausage, is prepared using the method.

16. Method as claimed in claim 15, characterized in that fresh sausage is prepared, wherein the fresh sausage is subjected to a cooling treatment once it has been brought to length after manufacture by co-extrusion, wherein the sausage is cooled to a temperature below 7° C.

17. Method as claimed in claim 16, characterized in that the sausage is frozen during the cooling treatment.

18. Method as claimed in claim 1, wherein the weight content of collagen in the casing mass is more than 2.5 times greater than the alginate content.

19. Food product obtained by co-extrusion obtainable according to the method as claimed in claim 1, comprising a meat mass and a casing, wherein the casing comprises at least collagen and alginate, and wherein the casing comprises a greater weight content of collagen than of alginate.

20. Food product obtained by co-extrusion as claimed in claim 19, characterized in that the food product is a sausage.

* * * * *